(12) United States Patent
Han et al.

(10) Patent No.: US 11,449,400 B2
(45) Date of Patent: Sep. 20, 2022

(54) METHOD, DEVICE AND PROGRAM PRODUCT FOR MANAGING DATA OF STORAGE DEVICE

(71) Applicant: EMC IP Holding Company LLC, Hopkinton, MA (US)

(72) Inventors: Geng Han, Beijing (CN); Xinlei Xu, Beijing (CN); Changyu Feng, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 429 days.

(21) Appl. No.: 16/582,615

(22) Filed: Sep. 25, 2019

(65) Prior Publication Data

US 2020/0133809 A1    Apr. 30, 2020

(30) Foreign Application Priority Data

Oct. 31, 2018  (CN) .......................... 201811290949.4

(51) Int. Cl.
  *G06F 11/20*    (2006.01)
  *G06F 3/06*    (2006.01)

(52) U.S. Cl.
  CPC ........ *G06F 11/2094* (2013.01); *G06F 3/0619* (2013.01); *G06F 3/0644* (2013.01); *G06F 3/0659* (2013.01); *G06F 3/0689* (2013.01); *G06F 2201/82* (2013.01)

(58) Field of Classification Search
  CPC .. G06F 11/2094; G06F 3/0619; G06F 3/0644; G06F 3/0659; G06F 3/0689; G06F 2201/82; G06F 11/1448; G06F 2201/81; G06F 11/1469; G06F 3/064; G06F 3/0629; G06F 11/1402
  USPC ....................................................... 714/6.22
  See application file for complete search history.

(56) References Cited

U.S. PATENT DOCUMENTS

| | | |
|---|---|---|
| 9,256,381 B1 | 2/2016 | Fultz et al. |
| 9,367,395 B1 | 6/2016 | Bono et al. |
| 9,367,405 B1 | 6/2016 | Foley et al. |
| 9,448,735 B1 | 9/2016 | Proulx et al. |
| 10,073,621 B1 | 9/2018 | Foley et al. |
| 10,365,983 B1 | 7/2019 | Foley et al. |
| 11,061,770 B1 | 7/2021 | Patel et al. |
| 11,099,940 B1 | 8/2021 | Patel et al. |
| 11,232,043 B2 | 1/2022 | Patel et al. |
| 11,256,678 B2 | 2/2022 | Patel et al. |

(Continued)

*Primary Examiner* — Yair Leibovich
(74) *Attorney, Agent, or Firm* — BainwoodHuang

(57) ABSTRACT

A technique involves: in response to receiving a request to write data to a storage device, acquiring metadata of a redundant array of independent disks (RAID) extent that is associated with the request to write data, the RAID extent being built based on disk slices comprised in a plurality of disks of the storage device; determining, based on the metadata, a disk slice of data write-enabled RAID extent to write the data; and copying an identification and a degradation number into a metadata page associated with a mapper for data recovery, the identification and degradation number being comprised in the metadata and associated with the data write-enabled RAID extent, the mapper being used to map a physical space and a virtual logical space, and the degradation number indicating the number of times that the disk slice comprised in the RAID extent changes from being normal to being degraded.

31 Claims, 5 Drawing Sheets

(56) References Cited

U.S. PATENT DOCUMENTS

| | | |
|---|---|---|
| 11,269,521 B2 | 3/2022 | Kang et al. |
| 11,269,738 B2 | 3/2022 | Armangau et al. |
| 11,275,518 B2 | 3/2022 | Gao et al. |
| 11,314,580 B2 | 4/2022 | Chawla et al. |
| 2015/0234719 A1* | 8/2015 | Coronado ............ G06F 3/0683 714/6.3 |
| 2019/0163409 A1* | 5/2019 | Li ........................ G06F 3/0604 |
| 2020/0133779 A1* | 4/2020 | Han ...................... G06F 3/0611 |

* cited by examiner

METHOD, DEVICE AND PROGRAM PRODUCT FOR MANAGING DATA OF STORAGE DEVICE

CROSS-REFERENCE TO RELATED APPLICATION

This application claims priority to Chinese Patent Application No. CN201811290949.4, on file at the China National Intellectual Property Administration (CNIPA), having a filing date of Oct. 31, 2018, and having "METHOD, DEVICE AND PROGRAM PRODUCT FOR MANAGING DATA OF STORAGE DEVICE" as a title, the contents and teachings of which are herein incorporated by reference in their entirety.

FIELD

The present disclosure relates to management of data, and more specifically to data management methods, devices, and computer program products.

BACKGROUND

In order to better manage and optimize the data storage performance of the storage device, a disk comprised in the storage device is divided into a plurality of disk slices, and then multiple disk slices based on the plurality of disks are bound into a RAID extent (or called Uber or extents), and the storage device is pooled into a disk pool. A data management scheme of the traditional storage device does not support the incremental data recovery or rebuild for the disk slice-based extent. Therefore, when the disk slice comprised in the disk fails, the entire data of the failed disk needs to be completely reconstructed on a newly-replaced disk in the disk extent pool or on the disk slices of associated RAID extent.

Since the traditional storage device data management scheme does not support incremental data recovery or rebuild for the disk slice-based extent, even if only individual disk slices fail, or the disk is incorrectly drawn out and then quickly inserted back, only a small amount of data is updated during the above period, and full data recovery needs to be performed. This not only reduces the efficiency of data recovery of the storage device, but also causes a large amount of unnecessary data read and write during the data recovery process, which is not conducive to prolonging the service life of the disk.

SUMMARY

The present disclosure provides a data management method, device, and computer program product for a storage device (or storage system), which can effectively improve data recovery efficiency of the storage device and avoid unnecessary data reading and writing in the data recovery process.

According to a first aspect of the present disclosure, there is provided a method of data management for a storage device. The method includes: in response to receiving a request to write data to a storage device, acquiring metadata of a redundant array of independent disks (RAID) extent that is associated with the request to write data, the RAID extent being built based on a plurality of disk slices comprised (or formed) in a plurality of disks of the storage device; determining, based on the metadata, a disk slice of data write-enabled RAID extent to write the data; and copying an identification and a degradation number into a metadata page associated with a mapper for data recovery of the storage device, the identification and degradation number being comprised in the metadata and associated with the data write-enabled RAID extent, the mapper being used to map a physical space and a virtual logical space of the storage device, and the degradation number indicating the number of times that the disk slice comprised in the RAID extent changes from being normal to being degraded.

According to a second aspect of the present invention, there is also provided a data management device. The device includes: a memory configured to store one or more programs; a processing unit coupled to the memory and configured to execute the one or more programs to cause the management device to perform acts including: in response to receiving a request to write data to a storage device, obtaining metadata of a redundant array of independent disks (RAID) extent that is associated with a request to write data, the RAID extent being built based on a plurality of disk slices comprised in a plurality of disks of the storage device; determining, based on the metadata, a disk slice of the data write-enabled RAID extent to write the data; and copying an identification and a degradation number into a metadata page that is associated with a mapper for data recovery of the storage device, the identification and degradation number being comprised in the metadata and associated with the data write-enabled RAID extent, the mapper being used to map a physical space and a virtual logical space of the storage device, and the degradation number indicating the number of times that the disk slice comprised in the RAID extent changes from being normal to being degraded.

According to a third aspect of the present disclosure, there is also provided a computer program product. The computer program product being tangibly stored on a non-transitory computer readable medium and including computer executable instructions. The machine executable instructions, when executed, causing a machine to perform steps of the method according to the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in example embodiments of the present disclosure.

DETAILED DESCRIPTION OF EMBODIMENTS

Figure 1:
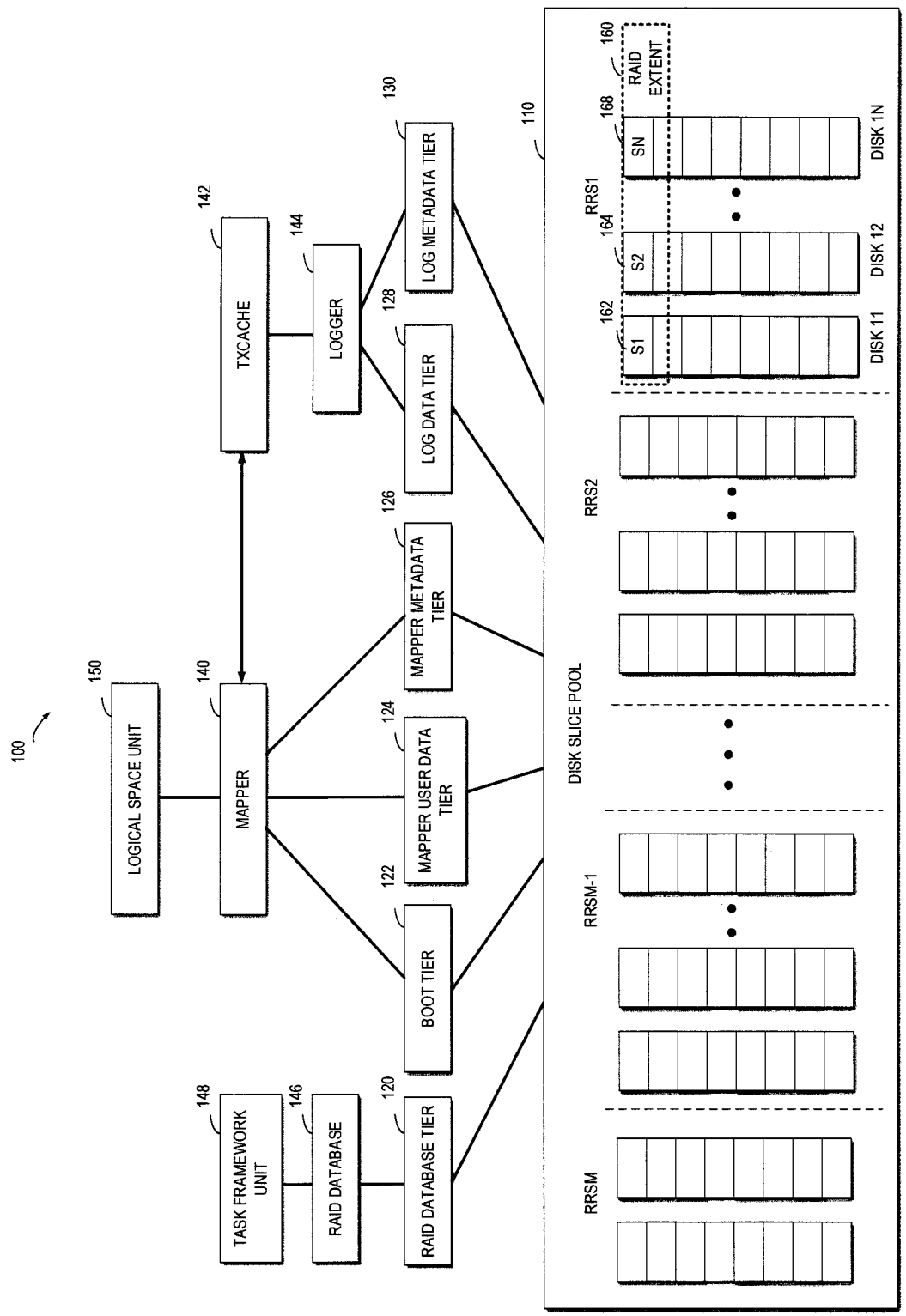
FIG. 1 shows an architectural diagram of a data storage device 100 in accordance with an embodiment of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

As described above, in a conventional data management solution of the storage device, since the physical state and the data conditions of the disk slices comprised in the disk slice extent cannot be known, the incremental data recovery or rebuild for the disk slice-based extent is not supported. Therefore, when the disk slice comprised in the disk fails, the entire data of the failed disk needs to be completely rebuilt to the newly-replaced disk in the disk extent pool or each disk slice of the associated RAID extent. Therefore, even if only individual disk slices fail, or if the failed disk slice only involves a small amount of data to be updated, all data need to be recovered. This significantly reduces the data recovery efficiency of the storage device, and causes a large amount of unnecessary data read and write, which is not conducive to extending the lifetime of the disk.

In order to at least partially address one or more of the above problems and other potential problems, example embodiments of the present disclosure propose a data management method for a storage device. The method includes: in response to receiving a request to write data to a storage device, acquiring metadata of a redundant array of independent disks (RAID) extent associated with a request to write data, the RAID extent being built based on a plurality of disk slices comprised in a plurality of disks of the storage device; determining, based on the metadata, the disk slice of the data write-enabled RAID extent, to write data; and copying an identification and a degradation number that are comprised in the metadata and associated with the data write-enabled RAID extent to a metadata page associated with a mapper, for data recovery of the storage device, the mapper being used to map a physical space and a virtual logical space of the storage device, and the degradation number indicating the number of times that the disk slice comprised in the RAID extent becomes from normal to degraded.

In the above solution, by acquiring metadata indicating the state of each disk slice of the RAID extent, and determining a disk slice of the data write-enabled RAID extent based on the metadata, it is possible to determine, according to the physical state of the disk slice, the disk slice of the RAID extent adapted to write data; and by copying, in the process of writing data to the storage device, the identification and the degradation number comprised in the metadata that is associated with the data write-enabled RAID extent to a metadata page that is associated with a mapper, it is possible to match the RAID extent with the corresponding identification and degradation number in the metadata page to determine whether the write to the corresponding disk slice is a complete data write process, so as to determine whether valid data to be recovered exists in the disk slice, and thereby determine the matched data recovery manner.

FIG. 1 shows an architectural diagram of a data storage device 100 in accordance with an embodiment of the present disclosure. It should be appreciated that the structure and function of the device as shown in FIG. 1 is for illustrative purposes only and does not imply any limitation to the scope of the present disclosure. Embodiments of the present disclosure may be embodied in different structures and/or functions.

As shown in FIG. 1, the device 100 includes a disk slice pool 110, a plurality of tiers 120 to 130, a mapper 140, a TxCache (transaction cache) 142, a logger 144, a RAID database 146, a task framework unit 148 and a logical space unit 150. In some embodiments, the device 100 is, for example, EMC's Trident RAID.

Regarding the disk slice pool 110, it is used to manage all the disks in the storage device. The disk slice pool 110 includes a plurality of RAID resilience sets (RRSs), such as RRS1, RRS2, RRSM-1, and RRSM. Each RRS includes multiple (e.g., 25) disks. For example, RRS1 includes a disk 11, a disk 12, and a disk 1N. Each RRS is a fault domain, and faults are physically isolated between different RRSs. It means that if a disk in an RRS fails, the failure will not affect the reliability of other RRSs. Each disk is divided into multiple disk slices with equal size (e.g., 4 GB). Thus, the disk slice pool 110 is essentially a collection of disk slices. In some embodiments, multiple RAID extents may be created in the disk slice pool 110. Each RAID extent is similar to a small traditional RAID. For example, if the RAID type is 4+1 RAID-5, in order to create a RAID extent, it is possible to allocate 5 free disk slices from different disks and bind the 5 disk slices into a RAID extent. The prerequisite is that all disk slices of a RAID extent should come from the same RRS.

Regarding tiers 120 to 130, they serve as a physical address space used by other elements. Each tier is bound by several RAID extents. For each tier, different RAID policies may be applied based on the type of data stored in it. But all bound RAID extents in a tier should involve the same RAID policy, i.e., involve the same RAID width and RAID type. Tiers may be extended as needed, in other words, new RAID extents may be dynamically allocated and added to a tier. For each tier, it is possible to use 2-way mirrored RAID or 3-way mirrored RAID. If the data on one tier requires a higher level of protection, a 3-way mirror will be used. Otherwise the 2-way mirror is employed.

In some embodiments, the device 100 for example includes: a RAID database tier 120, a boot tier 122, a mapper user data tier 124, a mapper metadata tier 126, a log data tier 128, and a log metadata tier 130, as shown in FIG. 1.

The RAID database tier 120 is special, it only includes one RAID extent, and it is not exposed to other elements, and only used internally by the disk slice pool 110.

The boot tier 122, the mapper user data tier 124, and the mapper metadata tier 126 are used by the mapper 140. The boot tier 122 may be configured as a 3-way mirror. In the boot tier 122, the mapper 140 stores some key configurations that will be loaded on a booting path. The mapper user data tier 124 may be configured as a parity RAID (e.g., RAID 5 or RAID 6). In general, the type and width of the RAID depend on the disk type and disk number in the system. In some embodiments, Trident RAID only supports 4/8/16+1 RAID 5 or 1/8/16+2 RAID 6. All host user data will be saved in the mapper user data tier 124. The mapper metadata tier 126 may be configured as a 2-way mirror. The mapper 140 will store its metadata, for example, the metadata in a manner of B+ tree node into the mapper user data tier 126.

The log data tier 128 and the log metadata tier 130 are exposed to the logger 144.

The mapper 140 is a core component of the device 100, and the mapper 140 is configured to map a virtual logical address space to a physical address space of the RAID. The mapper 140 treats each tier performing data interaction with it as a flat linear physical address space, and displays a single flat linear logical address space to the logical space unit 150. The logical address space may be as large as 8 EB. In some embodiments, mapper 140 employs a bunch of 3 level B+ trees to maintain, in the granularity of 4K page, the mapping between logical address and physical address. As described above, the mapper 140 uses the following three tiers: boot tier 122, mapper user data tier 124, and mapper metadata tier 126. When the mapper 140 processes IO, it will generate read IO and write IO to the corresponding tier. The mapper 140 operates in a logger-based mode, which means that when the mapper 140 writes host data to the user data tier, it will first aggregate enough pages, and then pack them into a 2 MB sized physical large disk slice (PLB), and write the PLB to RAID. After successfully saving the PLB, the mapper 140 will update the B+ tree to remember the new position of the page.

Regarding the TxCache 142, it is used to provide a caching function in the memory for acceleration of the mapping between the logical space and physical space. The TxCache 142 provides transaction processing and handling functionality to the mapper 140. When a transaction is committed, if the transaction modifies certain pages, in order to prevent data loss, it will retain, through the logger, all modifications in a special tier that is exposed to the RAID, for example the RAID database tier 120. In some embodiments, the log data tier 128 and the log metadata tier 130 are created on top of some special disks that is named Mt_Carmel. This disk has almost the same performance as DRAM and is superior to SSD.

Regarding the logger 144, it is used to use and manage the space of the log data tier 128 and the log metadata tier 130. The TxCache 142 will use the API that is exposed by the logger 144 to load and persist dirty pages.

Regarding the logical space unit 150, it is used to use and manage the flat linear logical address space that is exposed by the mapper 140, such as 8 EB. The logical space unit 150 is used to create and expose volumes for the host.

Figure 2:
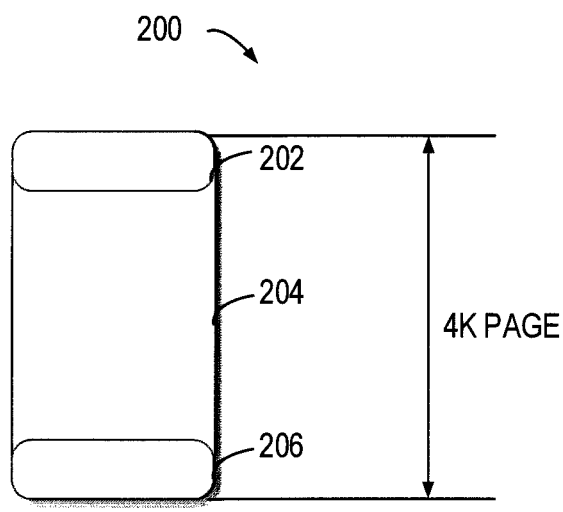
FIG. 2 illustrates a schematic diagram of a metadata page 200 stored in a mapper metadata tier in accordance with an embodiment of the present disclosure.

As mentioned above, the mapper metadata tier 126 may employ a 2-way mirror. The mapper saves its metadata page at the mapper metadata tier 126, for example, save its metadata page in a manner such as a B+ tree node page, a VLB descriptor page, a PLB description page, and the like. FIG. 2 shows a schematic diagram of a metadata page 200 stored by the mapper metadata tier according to an embodiment of the present disclosure. All metadata pages are, for example, 4 k sized, and share the same on-disk page layout. As shown in FIG. 2, the metadata page 200 includes a header 202 of the page, a setting 204 for each metadata page, and a checksum 206.

In order to enable the device 100 to support an incremental data recovery mode, in embodiments of the present disclosure, when a RAID extent is built, two portions of data associated with the created RAID extent are created. The two portions of data are position information (Uber geometry) of the RAID extent and metadata of the RAID extent.

Regarding the position information of the RAID extent, it indicates the position of the RAID extent. In some embodiments, the position of each disk slice comprised in the RAID extent may be recorded in an array. For example, record the disk slice comes from which disk slice of which disk.

Regarding RAID extent metadata, for example, it includes: an identification of a RAID extent (uber-> magic_number), degradation number of the RAID extent (uber->generation_number), and a disk slice status bitmap of the RAID extent (uber->rebuild_logging_bitmap), disk slice rebuild bitmap of the RAID extent (rebuild_bitmap) and new disk slice bitmap of the RAID extent (uber->newdisk_bitmap). In some embodiments, when the RAID extent in the storage device 100 is created or bound, metadata that is associated with the RAID extent is initialized; and RAID extent metadata is updated based on events associated with the RAID extent.

Regarding the identification of the RAID extent (uber->magic_number), it is used to indicate whether the disk slice of the RAID extent contains valid data of the RAID level. In some embodiments, when a RAID extent is created, allocated, or bound, an identification magic_number that is associated with the RAID extent is randomly generated, and the identification is, for example, a random number. When a data write I/O is detected, the identification and degradation number of the RAID extents are copied to the metadata page that is associated with the mapper 140. Therefore, if the disk slice contains valid data that is entirely written, the corresponding identification stored in the associated metadata page of the mapper 140 is consistent with the identification of the RAID extent, that is, blk_hdr->magic_number should be consistent with uber->magic_number. Therefore, by comparing the metadata, that is, the identification magic_number of the RAID extent, it is possible to identify whether the disk slice of the RAID extent contains valid data.

Regarding the degradations number of the RAID extent (uber->generation_number), it is updated when the state of the disk slice of the RAID extent becomes degraded. For example, when creating, allocating or binding a RAID extent, the degradation number is initialized to "0", and then, when the state of the disk slice of the sub-RAID extent is confirmed to change from "normal" to "degraded", the degradation number is increased by 1. However, when the rebuild of the disk slice has not been completed, the disk slice becomes degraded again, or more than two disk slices in the RAID extent become degraded at the same time, and the degradation number is not increased by 1.

Regarding the disk slice status bitmap of the RAID extent (uber->rebuild_logging_bitmap), it indicates whether the physical state of each disk slice of the RAID extent is normal. When a disk slice at one position of the RAID extent fails, the failed disk slice is not immediately replaced with a new disk slice for rebuild, but when the disk slice is incorrectly removed or the drive firmware is being upgraded (in this case, the disk will get offline for a while, and then get online again after the firmware upgrade is completed), new disk slice replacement and rebuild is performed after a predetermined time (for example, 5 minutes). In the above predetermined time window (for example, 5 minutes) during the replacement of the new disk slice, the bit in the disk slice status bitmap of the RAID extent and at a position corresponding to the degraded disk slice will be set to "1", to indicate the disk slice at this position is temporarily unavailable.

Table 1 below specifically shows the corresponding metadata when an associated disk of the disk slice D1 comprised in the RAID extent is moved away, after the RAID extent is initialized. As known from the data in Table 1, the identification of the RAID extent (uber->magic_number) is 0x12345678, and the RAID extent includes the disk slices D0 and D1. The disk that is associated with the disk slice D1 has been removed for more than 5 minutes, that is, the state of the disk slice D1 is changed from "normal" to "degraded", so the degradation number (uber->generation_number) is set to "1". The position of the disk slice status bitmap (uber->rebuild_logging_bitmap) corresponding to the position of D1 is set to "1", which indicates that disk slice D1 is temporarily unavailable.

TABLE 1

| V0 | V0 |
|---|---|
| MAG# 0x12345678 | MAG# 0x12345678 |
| GEN# 0 | GEN# 0 |
| D0 | D1 |
| ○ | X | uber->magic_number = 0x12345678
uber->generation_number = 1
uber->rebuild_logging_bitmap = 01
uber->rebuild_bitmap = 00
uber->newdisk_bitmap = 00

Regarding the disk slice rebuild bitmap of the RAID extent (uber->rebuild_bitmap), it indicates whether each disk slice of the RAID extent is being rebuilt. Once the removed disk slice is inserted back or replaced with a new disk slice, the corresponding bit in the disk slice rebuild bitmap of the RAID extent will be set to "1" to indicate that the disk slice corresponding to the position is to be rebuilt or is being rebuilt. Once the rebuild of the disk slice at that position is completed, the bit which has been set to "1" will be set to "0".

Table 2 below specifically shows the corresponding metadata when the associated disk of the disk slice D1 comprised in the RAID extent has been removed by mistake, and inserted again within 5 minutes. It may be seen from the data in Table 2 that the disk that is associated with the disk slice D1 is inserted back within 5 minutes after being removed, and the position of the disk slice status bitmap (uber->rebuild_logging_bitmap) corresponding to D1 is restored to "0", and meanwhile the position of the disk slice rebuild bitmap (uber->rebuild_bitmap) corresponding to D1 is set to "1", which indicates that the disk slice D1 of the RAID extent is to be rebuilt or being built.

TABLE 2

| V0 | V0 |
|---|---|
| MAG# 0x12345678 | MAG# 0x12345678 |
| GEN# 0 | GEN# 0 |
| D0 | D1 |
| ○ | ○ | uber->magic_number = 0x12345678
uber->generation_number = 1
uber->rebuild_logging_bitmap = 00
uber->rebuild_bitmap = 01
uber->newdisk_bitmap = 00

A new disk slice bitmap (uber->newdisk_bitmap) of the RAID extent indicates whether each disk slice of the RAID extent is a new disk slice. When a position is replaced with a new disk slice, the corresponding bit in the new disk slice bitmap of the RAID extent will be set to "1", to indicate that the disk slice corresponding to the position is the new disk slice, and all data on the disk slice is invalid before the rebuild is completed. Once the rebuild of the disk slice at that position is completed, the bit which has been set to "1" will be set to "0".

In the above technical solution, by creating and acquiring metadata associated with the created RAID extent, to indicate the status and data situation of each disk slice of the RAID extent, it is possible to know whether the data recovery mode is adapted to perform incremental data recovery or perform full data recovery, by knowing the current situations based on the metadata.

Table 3 below specifically illustrates the implementation of generating position information of the RAID extent and the processing logic of the RAID extent metadata. It needs to be emphasized that the implementation of the subsequent processing logic is merely by way of example and is not intended to limit the scope of the disclosure in any way.

TABLE 3

```
struct cyc_uber_mapping_dev_t
{
    cyc_u32_t disk-index        : 12;
    cyc_u32_t disk-extent-index : 20;
}
union cyc_uber_geometry_t
{
```

TABLE 3-continued

| | | | |
|---|---|---|---|
| cyc_uber_mapping_dev_t | mirror2way[2]; | //1 data disk, 1 parity disk | |
| cyc_uber_mapping_dev_t | mirror3way[3]; | //1 data disk, 2 parity disk | |
| } | | | |
| struct cyc_uber_info_t | | | |
| { | | | |
| cyc_uber_geceetry_t | geo; | | |
| uint32_t | magic_number; | //randomly being generated, when the RAID extent is allocated | |
| uint32_t | generation_number; | //+1 when the slice at any position becomes from "normal" to "degraded" | |
| uint32_t | rebuild_logging_bitmap; | //1: the slice at the corresponding position is offline, 0: the slice at the corresponding position is offline | |
| uint32_t | rebuild_bitmap; | //1: the disk at the corresponding position is rebuilding | |
| uint32_t | newdisk_bitmap; | //a new disk is swapped at the corresponding position | |
| } | | | |
| struct cyc_block_on_disk_header_t | | | |
| { | | | |
| uint32_t | magic_number; | //metadata copied from the RAID extent during write | |
| uint32_t | generation_number; | //metadata copied from the RAID extent dating write | |
| } | | | |

Figure 3:
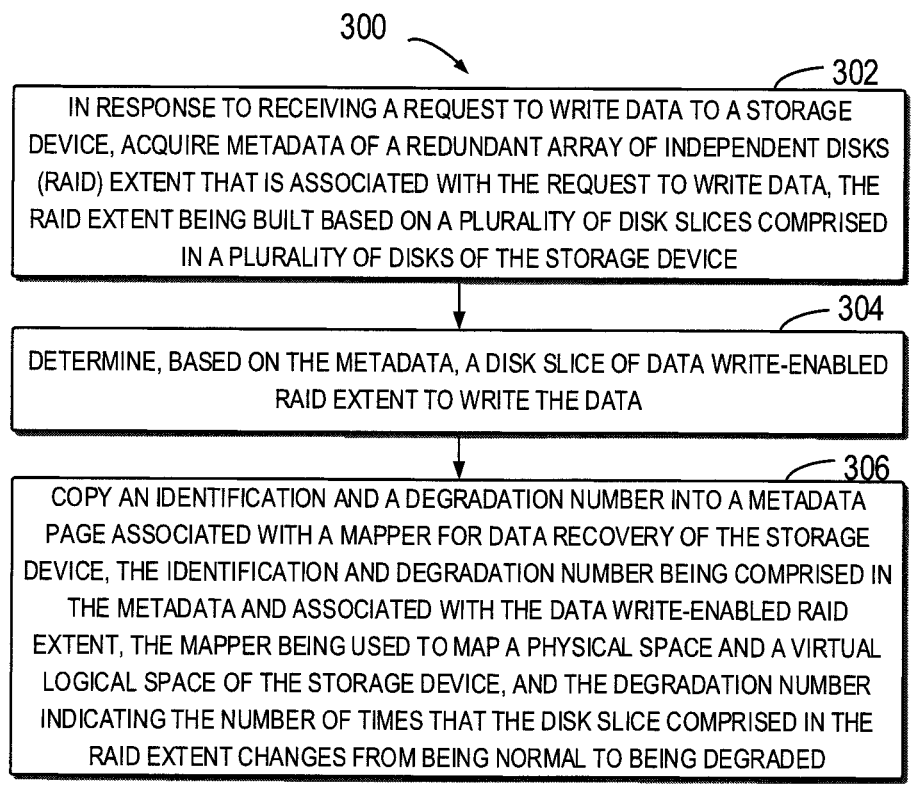
FIG. 3 illustrates a flow chart of a method 300 of data management for a storage device in accordance with an embodiment of the present disclosure.

FIG. 3 illustrates a flow chart of a method 300 of data management for a storage device in accordance with an embodiment of the present disclosure. In the embodiment shown in FIG. 3, actions are performed, for example, by a processor. The processor may be integrated in the storage device mentioned above, or may be comprised in a management device separate from the storage device. Method 300 may also include additional actions not shown and/or may omit the actions shown, the scope of the disclosure being not limited in this respect.

At block 302, when a request to write data to a storage device is received, metadata of a redundant array of independent disks (RAID) extent associated with a request to write data is acquired. The RAID extent is built based on a plurality of disk slices comprised in a plurality of disks of the storage device. Regarding the metadata of the RAID extent, in some embodiments, the metadata associated with the RAID extent is initialized when the RAID extent in the storage device is created or bound; and the metadata is updated based on events that are associated with the RAID extent. In some embodiments, the metadata associated with the RAID extent further includes: a disk slice status bitmap associated with the RAID extent, a disk slice rebuild bitmap, and a new disk slice bitmap, wherein the disk slice status bitmap indicates whether the physical state of each disk slice of the RAID extent is normal, the disk slice rebuild bitmap indicates whether each disk slice of the RAID extent is being rebuilt, and the new disk slice bitmap indicates whether each disk slice of the RAID extent is a new disk slice.

At block 304, the disk slice of data write-enabled RAID extent is determined based on the metadata, so as to write the data.

In some embodiments, determining the disk slice of the data write-enabled RAID extent includes: the disk slice of the data write-enabled RAID extent is determined based on the disk slice status bitmap comprised in the metadata, wherein the disk slice status bitmap indicates whether the physical state of each disk slice of the RAID extent is normal. In some embodiments, determining the disk slice of the data write-enabled RAID extent includes: a disk slice corresponding to a position that is "1" in the disk slice status bitmap (uber->rebuild_logging_bitmap) in the metadata is excluded, and a write data IO position list is generated based on positions that are not "1" in the disk slice status bitmap (uber->rebuild_logging_bitmap).

At block 306, an identification and a degradation number are copied into a metadata page associated with a mapper for data recovery of the storage device. The identification and degradation number are comprised in the metadata and associated with the data write-enabled RAID extent, the mapper is used to map a physical space and a virtual logical space of the storage device, and the degradation number indicates the number of times that the disk slice comprised in the RAID extent changes from being "normal" to being "degraded". For example, in the data write process, the identification (uber->magic_number) and the degradation number (uber->generation_number) in the metadata of the RAID extent are copied to the mapper; the mapper then stores the obtained uber->magic_number and uber->generation_number to a header of a mapper metadata page set with respect to the disk, to prepare the header data of each disk slice.

Regarding the identification, in some embodiments, it is for example a random number generated when the RAID extent is created. In some embodiments, the degradation number indicates the number of times that the disk slice comprised in the RAID extent becomes from normal to degraded includes: the degradation number is increased by 1 when the disk slice of the RAID extent changing from normal to degraded is confirmed; when any of the following conditions is satisfied: the disk slice becomes degraded again before the rebuild of the disk slice is completed; and more than two disk slices in the RAID extent become degraded simultaneously, the degradation number is not increased by 1.

In some embodiments, the header of the mapper metadata page at least includes: an identification (blk_hdr->magic_number) and a degradation number (blk_hdr->generation_number). If valid data is comprised in the associated disk slice in the mapper metadata page, the corresponding identification (blk_hdr->magic_number) in the header of the metadata page will match with the identification (uber->magic_number) of the associated RAID extent. The degradation number (blk_hdr->generation_number) in the mapper metadata page may be further used to identify whether the rebuild of the disk slice may be avoided.

In the above solution, by determining, based on the metadata of the RAID extent, the disk slice of the data write-enabled RAID extent, and copying the identification and degradation number that are associated with the data write-enabled RAID extent and comprised in the metadata during data write to the storage device to the metadata page that is associated with the mapper, it is possible to determine a write position based on the status of the disk slice in the RAID extent, and it is possible to determine, by matching the RAID extent with the corresponding identification and degradation number in the mapper metadata page, whether the disk slice includes valid data during data recovery, and determine the matched data recovery manner.

In some embodiments, the method 300 further includes: determining whether write is successfully performed for all disk slices of the RAID extent allowing data write; and in response to determining that write is not successfully performed for all disk slices of the data write-enabled RAID extent, re-acquiring metadata associated with the request to write data, to determine, based on the re-obtained metadata, the disk slices of the data write-enabled RAID extent. For example, when there is a disk slice to which data is not successfully written, for example, a possible reason is that during the data write, the corresponding disk slice changes from normal to degraded. In this case, it is necessary to determine, based on the disk slice status bitmap (uber->rebuild_logging_bitmap) in the re-obtained metadata, the disk slice of the data write-enabled RAID extent again.

Figure 4:
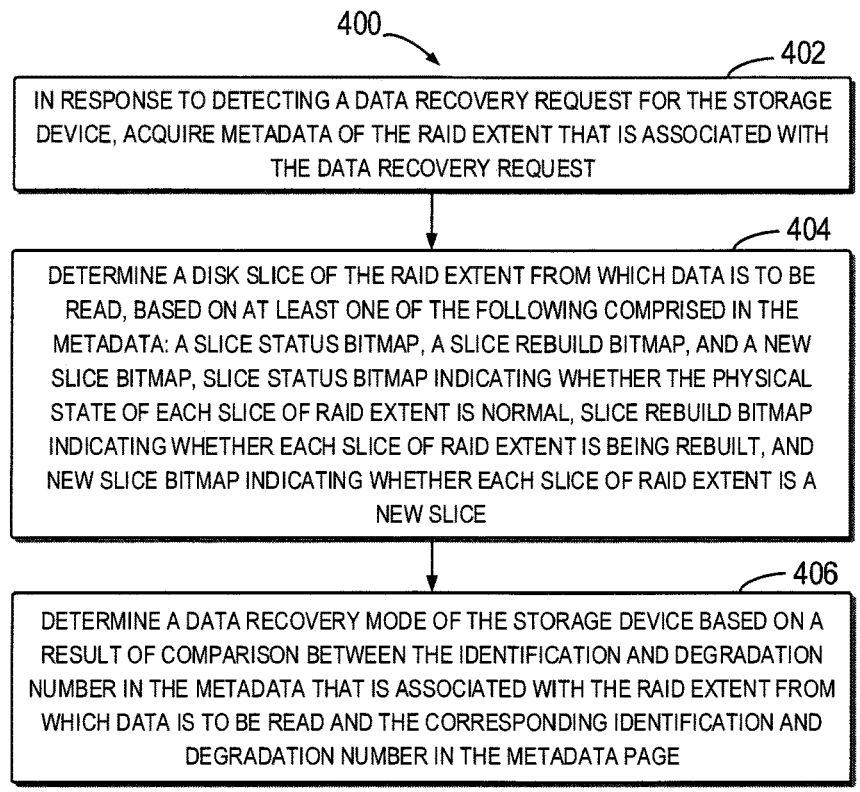
FIG. 4 illustrates a flow chart of a method 400 of data recovery of a storage device in accordance with an embodiment of the present disclosure.

In some embodiments, method 300 further includes a method of data recovery for the storage device. FIG. 4 illustrates a flow chart of a method 400 of data recovery for a storage device in accordance with an embodiment of the present disclosure. In the embodiment shown in FIG. 4, the various actions are performed, for example, by a processor. The processor may be integrated in the storage device mentioned above, or may be comprised in a management device separate from the storage device. Method 400 may also include additional actions not shown and/or may omit the actions shown, the scope of the disclosure being not limited in this respect.

At block 402, when a data recovery request for the storage device is detected, metadata of the RAID extent that is associated with the data recovery request is acquired.

At block 404, the disk slice of the RAID extent from which data is to be read is determined based on at least one of the following metadata: a disk slice status bitmap, a disk slice rebuild bitmap, and a new disk slice bitmap, the disk slice status bitmap indicating whether the physical state of each disk slice of the RAID extent is normal, the disk slice rebuild bitmap indicating whether each disk slice of the RAID extent is being rebuilt, and the new disk slice bitmap indicating whether each disk slice of the RAID extent is a new disk slice. In some embodiments, determining the disk slice of the RAID extent from which data is to be read includes: determining the relevant disk slice as the disk slice of the RAID extent from which data need not to be read, when any of the following conditions being satisfied: the disk slice status bitmap indicates that the physical state of the relevant disk slice is abnormal, and the disk slice rebuild bitmap indicates that the rebuild of the relevant disk slice is not completed, and the new disk slice bitmap indicates that the relevant disk slice is a new disk slice. In other words, when any of the above conditions is satisfied, it indicates that the state of the corresponding disk slice is not suitable for reading data for recovery. By adopting the above means, it is possible to quickly determine, based on the state of the disk slice, the disk slice that needs to be read for data recovery, which facilitates improvement of the efficiency of data recovery.

In some embodiments, source data for data recovery of the storage device is determined based on a comparison of the degradation number corresponding to the RAID extent where data need to be read in the metadata page.

At block 406, a data recovery mode of the storage device is determined based on a comparison between the identifications and degradation number in the metadata associated with the RAID extent from which data is to be read and the corresponding identification and degradation number in the metadata page. During the data write, the identification and degradation number in the metadata of the RAID extent is copied to the metadata page associated with the mapper. Therefore, by comparing whether the metadata matches with the identification and the degradation number in the metadata page, it is possible to identify whether the data on the determined disk slice from which data is to be read has undergone complete writing, so as to set the data recovery mode in a matched manner. For example, in some embodiments, in response to determining that the identification associated with the RAID extent from which the data is to be read is inconsistent with the corresponding identification in the metadata page, it is possible to confirm that the disk slice of the RAID extent from which data is to be read does not include valid data for data recovery.

In some embodiments, determining the data recovery mode of the storage device includes: in response to determining that the identification associated with the RAID extent from which data is to be read is consistent with the corresponding identification stored in the metadata page, further comparing the degradation number associated with the RAID extent from which data is to be read and the corresponding degradation number in the metadata page; and determining, based on a result of comparison of degradation numbers, whether the data recovery mode of the storage device is to perform incremental data recovery or perform full data recovery. In some embodiments, determining the data recovery mode of the storage device includes: determining a difference between the degradation number associated with the RAID extent from which data is to be read and the corresponding degradation number in the metadata page; a threshold about incremental data recovery is obtained; and the data recovery mode of the storage device is determined to perform full data recovery, when any of the following conditions being satisfied: the difference is less than the threshold, and the new disk slice bitmap associated with the RAID extent from which data is to be read indicates that the disk slice is a new disk slice; and the data recovery mode of the storage device is determined to perform incremental data recovery, when the difference being larger than or equal to the threshold. In some embodiments, the threshold is determined based on the disk slice rebuild bitmap and the disk slice status bitmap associated with the RAID extent from which data is to be read. For example, it is possible to perform an XOR operation on the disk slice rebuild bitmap (uber->rebuild_bitmap) and the disk slice status bitmap (uber->rebuild_logging_bitmap) associated with the RAID extent from which data is to be read, the threshold about the incremental data recovery is determined based on the number of "1" comprised in the XOR operation result.

Table 4 below specifically illustrates the implementation of the processing logic of the embodiment of determining the recovery manner described above. It needs to be appreciated that the implementation of the subsequent processing logic is only an example and is not intended to limit the scope of the disclosure in any way.

TABLE 4 assume:
    x = uber->generation_number − blk_hdr->generation_number
    d = numberOfSetBits(uber->rebuild_bitmap |
    uber->rebuild_logging_bitmap)
if (x < d || uber->newdisk_bitmap != 0)
    normal rebuild
else
    fast rebuild How to determine the data recovery mode is explained below in conjunction with the metadata in the RAID extent and the corresponding data stored in the metadata page, which are specifically shown in Table 5. Disk slices D0, D1 and D2 are comprised in the RAID extent.

TABLE 5

| V1 | V0 | V1 |
|---|---|---|
| MAG# 0x12345678 | MAG# 0x12345678 | MAG# 0x12345678 |
| GEN# 1 | GEN# 0 | GEN# 1 |
| D0 | D1 | D2 |
| ○ | ○ | X | uber->magic_number = 0x12345678
uber->generation_number = 2
uber->rebuild_logging_bitmap = 001
uber->rebuild_bitmap = 010
uber->newdisk_bitmap = 000

In the data as shown in Table 5, the disk slice status bitmap (uber->rebuild_logging_bitmap) is 001, which indicates that the disk slice D2 is temporarily unavailable, and the disk slice rebuild bitmap (uber->rebuild_bitmap) is 010, which indicates that the disk slice D1 is being rebuilt. Therefore, it is determined that the disk slice D0 is a disk slice to be read, and data is read from the disk slice D0. Subsequently, it is determined that the identification of the RAID extent that is associated with the disk slice D0 (uber->magic_number) is consistent with the corresponding identification (MAG #) stored in the metadata page, and both of them are 0x12345678, and then the degradation number of the RAID extent (uber)->generation_number) is further compared with the corresponding degradation number (GEN #) in the metadata page. According to the data in Table 5, the degradation number of the RAID extent is 2, the corresponding degradation number in the metadata page is 1, and a difference between the degradation number of the RAID extent (uber->generation_number) and the corresponding degradation number in the metadata page (GEN #) is x=2−1=1. The threshold d is determined based on the number of "1" comprised in the XOR result of the disk slice rebuild bitmap (rebuild_bitmap) and the disk slice status bitmap (uber->rebuild_logging_bitmap) associated with the RAID extent. According to the data in Table 5, d=2. It may be seen that the difference x is smaller than the threshold d, therefore, it is determined that the data recovery mode is to perform full data recovery.

How to determine the data recovery mode is explained below in conjunction with the metadata stored in the RAID extent and the corresponding data stored in the metadata page, which are specifically shown in Table 6. Disk slices D0 and D1 are comprised in the RAID extent.

TABLE 6

| V0 | V0 |
|---|---|
| MAG# 0x12345678 | MAG# 0x12345678 |
| GEN# 1 | GEN# 0 |
| D0 | D1 |
| ○ | ○ | uber->magic_number = 0x12345678
uber->generation_number = 1
uber->rebuild_logging_bitmap = 00
uber->rebuild_bitmap = 01
uber->newdisk_bitmap = 00

In the data shown in Table 6, the disk slice status bitmap (uber->rebuild_logging_bitmap) is 00, which indicates that the disk slice D0 is available, and the disk slice rebuild bitmap (uber->rebuild_bitmap) is 01, which indicates that the disk slice D1 is being rebuilt. Therefore, It is determined that the disk slice D0 is a disk slice to be read, and data is read from the disk slice D0. Subsequently, the degradation number (uber->generation_number) of the RAID extent is inconsistent with the corresponding degradation number (GEN #) in the metadata page. The degradation number of the RAID extent is 1, and the corresponding degradation number in the metadata page is 0, and the difference x between the degradation number (uber->generation_number) associated with the RAID extent and the corresponding degradation number (GEN #) in the metadata page is equal to 1, namely, x=1. The threshold d=1. The difference x is equal to the threshold d, and it is determined that the data recovery mode is to perform incremental data recovery.

In the above solution, by determining the disk slice of the RAID extent from which data is to be read based on at least one of the disk slice status bitmap, disk slice rebuild bitmap and new disk slice bitmap in the metadata, and determining the write position based on the status of the disk slice in the RAID extent, and by determining the data recovery mode by respectively comparing the corresponding identifications and degradation numbers in the RAID extent with the metadata page associated with the mapper, it is possible to implement data read only with respect to the disk slice whose physical state is normal and which includes valid data, namely, and to implement the match of the data recovery mode and the state of the disk slice and situations of the valid state, which cause to improve the efficiency of data recovery, effectively avoid unnecessary data read and write, and facilitate extension of the lifetime of the disk.

Figure 5:
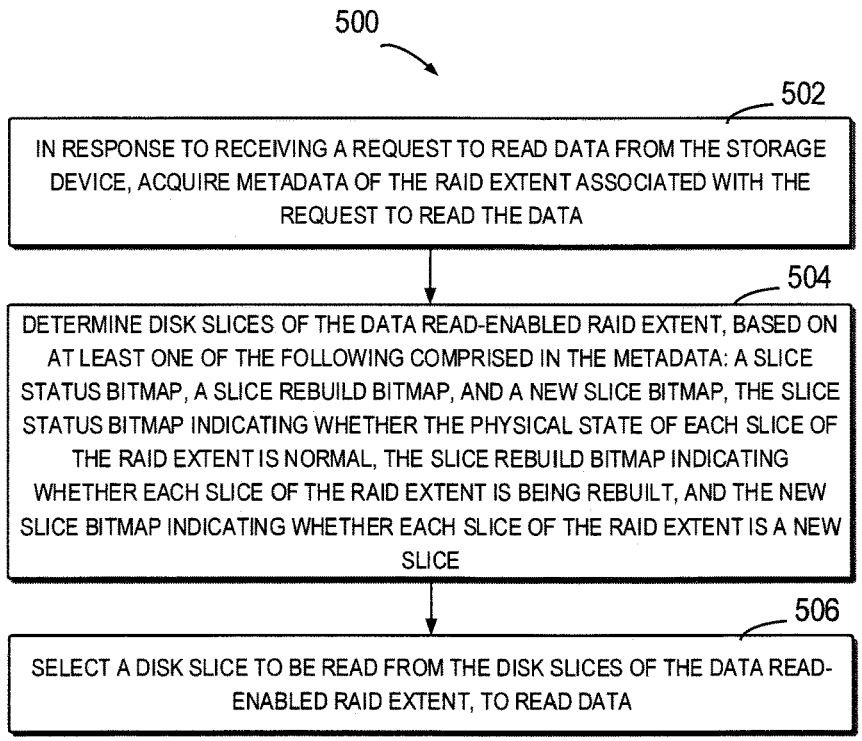
FIG. 5 illustrates a flow chart of a method 500 of reading data from a storage device in accordance with an embodiment of the present disclosure.

In some embodiments, method 300 further includes a method of reading data from a storage device. FIG. 5 illustrates a flow chart of a method 500 of reading data from a storage device according to an embodiment of the present disclosure. In the embodiment shown in FIG. 5, actions are performed, for example, by a processor. The processor may be integrated in the storage device mentioned above, or may be comprised in a management device separate from the storage device. Method 500 may also include additional actions not shown and/or may omit the actions shown, the scope of the disclosure being not limited in this respect.

At block 502, when a request to read data from the storage device is received, metadata of the RAID extent associated with the request to read the data is acquired.

At block 504, a disk slice of data read-enabled RAID extent is determined based on at least one of the following in the metadata: a disk slice status bitmap, a disk slice rebuild bitmap, and a new disk slice bitmap. In some embodiments, wherein determining the disk slice of the data read-enabled RAID extent includes: the relevant disk slice is determined as a disk slice of the RAID extent from which is not allowed to read data, when any of the following conditions being satisfied: the disk slice status bitmap indicates that the physical state of the relevant disk slice is abnormal, the disk slice rebuild bitmap indicates the related disk slice does not complete the rebuild, and the new disk slice bitmap indicates that the relevant disk slice is a new disk slice. For example, the disk slice at the position corresponding to "1" in the disk slice status bitmap, the disk slice at the position corresponding to "1" in the disk slice rebuild bitmap, and the disk slice at the position corresponding to "1" in the disk slice rebuild bitmap are determined as the disk slice from which data are not allowed to be read; a disk slice list of effectively reading IO position is generated based on positions other than the positions from which the data is not allowed to be read.

At block 506, from the disk slices of the data read-enabled RAID extent, a disk slice to be read is selected to readg data. In some embodiments, selecting the read disk slice includes: selecting the disk slice to be read from a plurality of disk slices of the data read-enabled RAID extent, based on a load of each disk slice of the data read-enabled RAID extent. In some embodiments, the read data IO is sent to the selected disk slice to be read.

Figure 6:
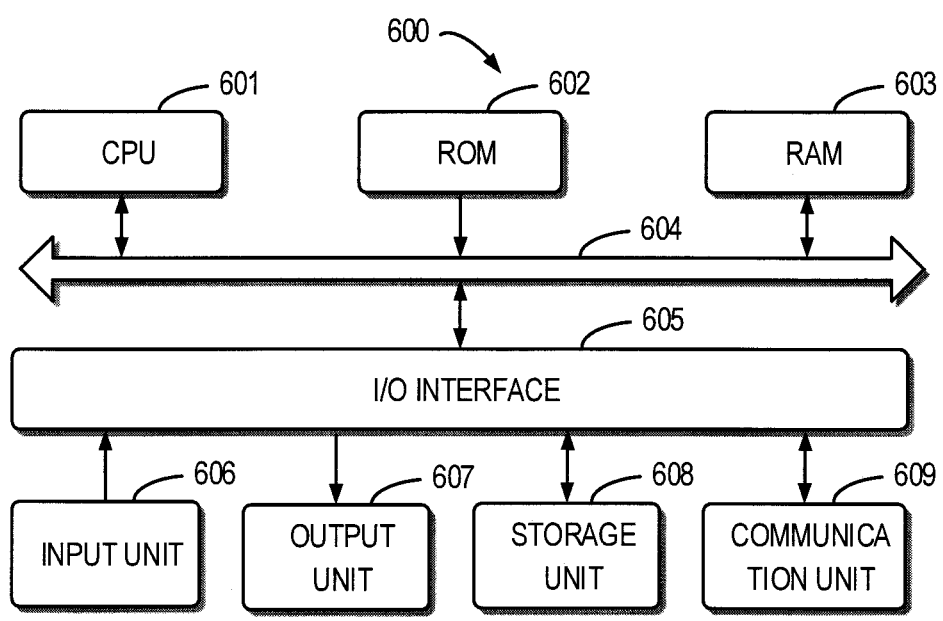
FIG. 6 schematically illustrates a disk slice diagram of an electronic device 600 that may be used to implement embodiments of the present disclosure.

FIG. 6 illustrates a schematic disk slice diagram of an electronic device 600 that may be used to implement embodiments of the present disclosure. The device 600 may be used for a system for implementing the method 300 of data management, the method 400 of data recovery and the method 500 of data read for the storage device as shown in FIGS. 3-5. As shown in FIG. 6, the device 600 includes a central processing unit (CPU) 601 which is capable of performing various processes in accordance with computer program instructions stored in a read only memory (ROM) 602 or computer program instructions loaded from a storage unit 608 to a random access memory (RAM) 603. In the RAM 603 are stored various programs and data as required by operation of the device 600. The CPU 601, the ROM 602 and the RAM 603 are connected to one another via a bus 604. An input/output (I/O) interface 605 is also connected to the bus 604.

The following components in the device 600 are connected to the I/O interface 605: an input unit 606 including a keyboard, a mouse, or the like; an output unit 607 such as various types of displays and speakers; a storage unit 608 such as a magnetic disk or optical disk; and a communication unit 609 such as a network card, a modem, a wireless communication transceiver or the like. The communication unit 609 allows the device 600 to exchange information/data with other devices via a computer network such as the Internet and/or various telecommunication networks.

The processing unit 601 performs various method and processes described above, for example, a system for implementing the method 300 of data management, the method 400 of data recovery and the method 500 of data read for the storage device. For example, in some embodiments, the method 300, 400 and 500 may be implemented as a computer software program which is stored in a machine-readable medium, for example the storage unit 608. In some embodiments, part or all of the computer program may be loaded and/or installed on the device 600 via ROM 602 and/or communication unit 609. When the computer program is loaded in the RAM 603 and executed by CPU 601, one or more steps of the method 300, 400 and 500 described above may be executed. Alternatively, in other embodiments, the CPU 601 may be configured to perform one or more actions of the method 300, 400 or 500 in any other suitable manner (e.g., by means of firmware).

Embodiments of the present disclosure relate to a method, device, system and/or computer program product. The computer program product may include a computer readable storage medium on which computer readable program instructions for executing various aspects of the present disclosure are embodied.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, section, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may some the number of times be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What are described above are only optional embodiments of the present disclosure, and are not intended to limit the present disclosure, and those skilled in the art appreciate that various changes and modifications may be made to the present disclosure. Any modifications, equivalent substitutions, improvements, etc., made within the spirit and scope of the present disclosure are intended to be comprised within the scope of the present disclosure.

We claim:

1. A method of data management of a storage device, comprising:
in response to receiving a request to write data to a storage device, acquiring metadata of a redundant array of independent disks (RAID) extent that is associated with the request to write data, the RAID extent being built based on a plurality of disk slices comprised in a plurality of disks of the storage device;
determining, based on the metadata, a disk slice of a data write-enabled RAID extent to write the data; and
copying an identification and a degradation number into a metadata page associated with a mapper for data recovery of the storage device, the identification and degradation number being comprised in the metadata and associated with the data write-enabled RAID extent, the mapper being used to map a physical space and a virtual logical space of the storage device, and the degradation number indicating a number of times that the disk slice comprised in the RAID extent changes from being normal to being degraded.

2. The method according to claim 1, further comprising:
determining whether a write is successfully performed for all disk slices of the data write-enabled RAID extent; and
in response to determining that the write fails to be performed for all the disk slices of the data write-enabled RAID extent, re-acquiring metadata associated with the request to write data, to determine the disk slices of the data write-enabled RAID extent based on the re-acquired metadata.

3. The method according to claim 1, wherein determining a disk slice of the data write-enabled RAID extent comprises:
determining the disk slice of the data write-enabled RAID extent based on a disk slice status bitmap comprised in the metadata, the disk slice status bitmap indicating whether physical states of respective disk slices of the RAID extent are normal.

4. The method according to claim 1, wherein for the degradation number indicating the number of times that the disk slice comprised in the RAID extent changes from normal to degraded,
in response to determining that the disk slice of the RAID extent changes from being normal to being degraded, the degradation number is increased by 1, and
the degradation number is stopped from being increased by 1 in response to any of the following conditions being satisfied:
the disk slice is degraded again before rebuilding of the disk slice is completed; and
more than two disk slices in the RAID extent are degraded at a same time.

5. The method according to claim 1, further comprising:
in response to creating or binding the RAID extent in the storage device, initializing the metadata associated with the RAID extent; and
updating the metadata based on an event associated with the RAID extent.

6. The method according to claim 1, further comprising:
in response to detecting a data recovery request for the storage device, acquiring metadata of the RAID extent that is associated with the data recovery request;
determining a disk slice of the RAID extent from which data is to be read, based on at least one of the following comprised in the metadata that is associated with the data recovery request:

a disk slice status bitmap indicating whether physical states of respective disk slices of the RAID extent are normal, a disk slice rebuild bitmap indicating whether the respective disk slices of the RAID extent are being rebuilt, and a new disk slice bitmap indicating whether the respective disk slices of the RAID extent are new disk slices; and determining a data recovery mode of the storage device based on a result of comparison between the identification and degradation number in the metadata that is associated with the RAID extent from which data is to be read and the corresponding identification and degradation number in the metadata page.

7. The method according to claim 6, further comprising:
determining source data for data recovery of the storage device based on a magnitude of the degradation number in the metadata page corresponding to the RAID extent from which data is to be read.

8. The method according to claim 6, wherein determining the disk slice of the RAID extent from which data is to be read comprises:
determining a related disk slice as the disk slice of the RAID extent from which no data is to be read, in response to any of the following conditions being satisfied:
the disk slice status bitmap indicating that a physical state of the related disk slice is abnormal,
the disk slice rebuild bitmap indicating that rebuilding of the related disk slice is not completed, and
the new disk slice bitmap indicating that the related disk slice is a new disk slice.

9. The method according to claim 6, wherein determining the data recovery mode of the storage device comprises:
in response to determining that the identification associated with the RAID extent from which data is to be read is consistent with the corresponding identification stored in the metadata page, comparing the degradation number associated with the RAID extent from which data is to be read and the corresponding degradation number in the metadata page; and
determining, based on a result of the comparison of the degradation numbers, whether the data recovery mode of the storage device is to perform incremental data recovery or to perform full data recovery.

10. The method according to claim 9, wherein determining the data recovery mode of the storage device comprises:
determining a difference between the degradation number that is associated with the RAID extent from which data is to be read and the corresponding degradation number in the metadata page;
obtaining a threshold about incremental data recovery;
in response to any of the following conditions being satisfied:
the difference being less than the threshold, and
the new disk slice bitmap associated with the RAID extent from which data is to be read indicating that the disk slice is a new disk slice,
determining that the data recovery mode of the storage device is to perform full data recovery; and
in response to the difference being larger than or equal to the threshold, determining that the data recovery mode of the storage device is to perform incremental data recovery.

11. The method according to claim 10, wherein the threshold is determined based on the disk slice rebuild bitmap and the disk slice status bitmap associated with the RAID extent from which data is to be read.

12. The method according to claim 9, further comprising:
in response to determining that the identification associated with the RAID extent from which data is to be read is inconsistent with the corresponding identification in the metadata page, determining that the disk slice of the RAID extent from which data is to be read excludes valid data for data recovery.

13. The method according to claim 1, further comprising:
in response to receiving a request to read data from the storage device, acquiring metadata of the RAID extent associated with the request to read the data;
determining disk slices of a data read-enabled RAID extent, based on at least one of the following comprised in the metadata of the RAID extent associated with the request to read the data:
a disk slice status bitmap indicating whether physical states of respective disk slices of the RAID extent are normal,
a disk slice rebuild bitmap indicating whether the respective disk slices of the RAID extent are being rebuilt, and
a new disk slice bitmap indicating whether the respective disk slices of the RAID extent are new disk slices; and
selecting a disk slice to be read from the disk slices of the data read-enabled RAID extent, to read data.

14. The method according to claim 13, wherein determining the disk slices of the data read-enabled RAID extent comprises:
determining a related disk slice as a disk slice of the RAID extent from which no data is to be read, in response to any of the following conditions being satisfied:
the disk slice status bitmap indicating that a physical state of the related disk slice is abnormal,
the disk slice rebuild bitmap indicating a rebuilding of the related disk slice is not completed, and
the new disk slice bitmap indicating that the related disk slice is a new disk slice.

15. The method according to claim 13, wherein selecting the disk slice to be read comprises:
selecting the disk slice to be read from a plurality of disk slices of the data read-enabled RAID extent, based on loads of the respective disk slices of the data read-enabled RAID extent.

16. A data management device, comprising:
a memory configured to store one or more programs;
a processing unit coupled to the memory and configured to execute the one or more programs to cause the device to perform acts comprising:
in response to receiving a request to write data to a storage device, obtaining metadata of a redundant array of independent disks (RAID) extent that is associated with the request to write data, the RAID extent being built based on a plurality of disk slices comprised in a plurality of disks of the storage device;
determining, based on the metadata, a disk slice of a data write-enabled RAID extent to write the data; and
copying an identification and a degradation number into a metadata page that is associated with a mapper for data recovery of the storage device, the identification and degradation number being comprised in the metadata and associated with the data write-enabled RAID extent, the mapper being used to map a physical space and a virtual logical space of the storage device, and the degradation number indicating a number of times that the disk slice comprised in the RAID extent changes from being normal to being degraded.

17. The device according to claim 16, the acts further comprising:
   determining whether a write is successfully performed for all disk slices of the data write-enabled RAID extent; and
   in response to determining that the write fails to be performed for all the disk slices of the data write-enabled RAID extent, re-acquiring metadata associated with the request to write data, to determine the disk slices of the data write-enabled RAID extent based on the re-acquired metadata.

18. The device according to claim 16, wherein the determining a disk slice of the data write-enabled RAID extent comprises:
   determining the disk slice of the data write-enabled RAID extent based on a slice status bitmap comprised in the metadata, a disk slice status bitmap indicating whether physical states of respective slices of the RAID extent are normal.

19. The device according to claim 16, wherein the degradation number indicating the number of times that the disk slice comprised in the RAID extent becomes from normal to degraded comprises:
   in response to determining that the disk slice of the RAID extent changes from being normal to being degraded, the degradation number is increased by 1, and
   the degradation number is stopped from being increased by 1 in response to any of the following conditions being satisfied:
   the disk slice is degraded again before rebuilding of the disk slice is completed; and
   more than two slices in the RAID extent are degraded at a same time.

20. The device according to claim 16, wherein the acts further comprise:
   in response to creating or binding the RAID extent in the storage device, initializing the metadata associated with the RAID extent; and
   updating the metadata based on an event associated with the RAID extent.

21. The device according to claim 16, wherein the acts further comprise:
   in response to detecting a data recovery request for the storage device, obtaining metadata of the RAID extent that is associated with the data recovery request;
   determining a slice of the RAID extent from which data is to be read, based on at least one of the following comprised in the metadata that is associated with the data recovery request:
   a slice status bitmap indicating whether physical states of respective slices of the RAID extent are normal,
   a slice rebuild bitmap indicating whether the respective slices of the RAID extent are being rebuilt, and
   a new slice bitmap indicating whether the respective slices of the RAID extent are new slices; and
   determining a data recovery mode of the storage device based on a result of comparison between the identification and degradation number in the metadata that is associated with the RAID extent from which data is to be read and the corresponding identification and degradation number in the metadata page.

22. The device according to claim 21, wherein the acts further comprise:
   determining source data for data recovery of the storage device based on a magnitude of the degradation number in the metadata page corresponding to the RAID extent from which data is to be read.

23. The device according to claim 21, wherein the determining the disk slice of the RAID extent from which data is to be read comprises:
   determining a related disk slice as the disk slice of the RAID extent from which no data is to be read, in response to any of the following conditions being satisfied:
   a disk slice status bitmap indicating that a physical state of the related disk slice is abnormal,
   a disk slice rebuild bitmap indicating that rebuilding of the related disk slice is not completed, and
   the new slice bitmap indicating that the related disk slice is a new slice.

24. The device according to claim 21, wherein the determining the data recovery mode of the storage device comprises:
   in response to determining that the identification associated with the RAID extent from which data is to be read is consistent with the corresponding identification stored in the metadata page, comparing the degradation number associated with the RAID extent from which data is to be read and the corresponding degradation number in the metadata page; and
   determining, based on a result of the comparison of the degradation numbers, whether the data recovery mode of the storage device is to perform incremental data recovery or to perform full data recovery.

25. The device according to claim 21, wherein the determining the data recovery mode of the storage device comprises:
   determining a difference between the degradation number that is associated with the RAID extent from which data is to be read and the corresponding degradation number in the metadata page;
   obtaining a threshold about incremental data recovery;
   in response to any of the following conditions being satisfied:
   the difference being less than the threshold, and
   the new slice bitmap associated with the RAID extent from which data is to be read indicating that the disk slice is a new slice,
   determining that the data recovery mode of the storage device is to perform full data recovery; and
   in response to the difference being larger than or equal to the threshold, determining that the data recovery mode of the storage device is to perform incremental data recovery.

26. The device according to claim 25, wherein the threshold is determined based on a disk slice rebuild bitmap and a disk slice status bitmap associated with the RAID extent from which data is to be read.

27. The device according to claim 21, wherein the acts further comprise:
   in response to determining that the identification associated with the RAID extent from which data is to be read is inconsistent with the corresponding identification in the metadata page, determining that the disk slice of the RAID extent from which data is to be read does not include valid data for data recovery.

28. The device according to claim 16, wherein the acts further comprise:

in response to receiving a request to read data from the storage device, obtaining metadata of the RAID extent associated with the request to read the data;

determining slices of a data read-enabled RAID extent, based on at least one of the following comprised in the metadata of the RAID extent associated with the request to read the data:

a slice status bitmap indicating whether physical states of respective slices of the RAID extent are normal, a slice rebuild bitmap indicating whether the respective slices of the RAID extent are being rebuilt, and a new slice bitmap indicating whether the respective slices of the RAID extent are new slices; and selecting a slice to be read from the disk slices of the data read-enabled RAID extent, to read data.

29. The device according to claim 28, wherein the determining the disk slices of the data read-enabled RAID extent comprises:

determining a related disk slice as a slice of the RAID extent from which no data is to be read, in response to any of the following conditions being satisfied:

a disk slice status bitmap indicating that a physical state of the related disk slice is abnormal, a disk slice rebuild bitmap indicating a rebuilding of the related disk slice is not completed, and the new slice bitmap indicating that the related disk slice is a new slice.

30. The device according to claim 28, wherein selecting the to be read disk slice comprises:

selecting the disk slice to be read from a plurality of slices of the data read-enabled RAID extent, based on loads of the respective slices of the data read-enabled RAID extent.

31. A computer program product having a non-transitory computer readable medium which stores a set of instructions to perform data management of a storage device; the set of instructions, when carried out by computerized circuitry, causing the computerized circuitry to perform a method of:

in response to receiving a request to write data to a storage device, acquiring metadata of a redundant array of independent disks (RAID) extent that is associated with the request to write data, the RAID extent being built based on a plurality of disk slices comprised in a plurality of disks of the storage device;

determining, based on the metadata, a disk slice of a data write-enabled RAID extent to write the data; and copying an identification and a degradation number into a metadata page associated with a mapper for data recovery of the storage device, the identification and degradation number being comprised in the metadata and associated with the data write-enabled RAID extent, the mapper being used to map a physical space and a virtual logical space of the storage device, and the degradation number indicating a number of times that the disk slice comprised in the RAID extent changes from being normal to being degraded.

* * * * *